(12) United States Patent
Alexanderson

(10) Patent No.: US 10,280,012 B2
(45) Date of Patent: May 7, 2019

(54) FIREWOOD HANDLING DEVICE

(71) Applicant: Logcon Hortinorr AB, Narva (EE)

(72) Inventor: Lars Alexanderson, Norström (SE)

(73) Assignee: LOGCON HORTINORR AB, Narva (EE)

( * ) Notice: Subject to any disclaimer, the term of this patent is extended or adjusted under 35 U.S.C. 154(b) by 0 days.

(21) Appl. No.: 15/544,166

(22) PCT Filed: Jan. 22, 2016

(86) PCT No.: PCT/SE2016/050039
§ 371 (c)(1),
(2) Date: Jul. 17, 2017

(87) PCT Pub. No.: WO2016/118069
PCT Pub. Date: Jul. 28, 2016

(65) Prior Publication Data
US 2018/0009610 A1    Jan. 11, 2018

(30) Foreign Application Priority Data
Jan. 22, 2015   (SE) ..................................... 1550053

(51) Int. Cl.
*B65G 19/02*  (2006.01)
*B65G 19/10*  (2006.01)
(Continued)

(52) U.S. Cl.
CPC ............. *B65G 47/66* (2013.01); *B65G 19/02* (2013.01); *B65G 19/10* (2013.01); *B65G 19/185* (2013.01);
(Continued)

(58) Field of Classification Search
CPC ...... B65G 47/66; B65G 47/763; B65G 19/02; B65G 19/185; B65G 19/225; B65G 17/24; B65G 17/32
(Continued)

(56) References Cited

U.S. PATENT DOCUMENTS 3,083,810 A * 4/1963 Zebarth .............. A22C 21/0053
198/445
4,450,951 A * 5/1984 Szanati .................. B65G 47/57
198/475.1

(Continued)

FOREIGN PATENT DOCUMENTS

| EP | 1828031 A2 | 9/2007 |
|---|---|---|
| SE | 1100065 A1 | 7/2012 |
| SE | 1100065 A1 | 7/2012 |

OTHER PUBLICATIONS

US 3,569,502 A, 06/1971, Maillet et al. (withdrawn)
International Search Report and Written Opinion dated May 30, 2016 for PCT Application No. PCT/SE2016/050039.

*Primary Examiner* — William R Harp
(74) *Attorney, Agent, or Firm* — Moser Taboada

(57) ABSTRACT

A firewood handling device for firewood pieces comprises a conveyor including one or more rotating, endless chains, wherein the conveyor extends from an input end to an output end. The conveyor chains are provided with carriers which project outwards from the outer sides of the chains and extend across and on a distance from each other in relation to the longitudinal extension of the conveyor such that spaces are formed between the carriers into which firewood pieces can be positioned. The carriers are formed with at least two, not cut through slots or recesses from below as well as from above which overlap each other. The conveyor in its output end is provided with at least two inner guiding members as well as with at least two outer guiding members.

9 Claims, 5 Drawing Sheets

(51) Int. Cl.
    *B65G 19/18*    (2006.01)
    *B65G 19/22*    (2006.01)
    *B65G 47/66*    (2006.01)
    *B65G 47/76*    (2006.01)

(52) U.S. Cl.
    CPC ......... *B65G 19/225* (2013.01); *B65G 47/763* (2013.01); *B65G 2201/0282* (2013.01); *B65G 2812/02861* (2013.01)

(58) Field of Classification Search
    USPC ....... 198/725–735.6, 817, 690.2, 688.1, 698, 198/699, 699.1, 697, 600
    See application file for complete search history.

(56) References Cited

U.S. PATENT DOCUMENTS

| | | | |
|---|---|---|---|
| 6,173,829 B1 | 1/2001 | Jackson et al. | |
| 7,506,750 B2 * | 3/2009 | Costanzo | B65G 17/24 198/600 |
| 2006/0260454 A1 | 11/2006 | Hannebauer | |

\* cited by examiner

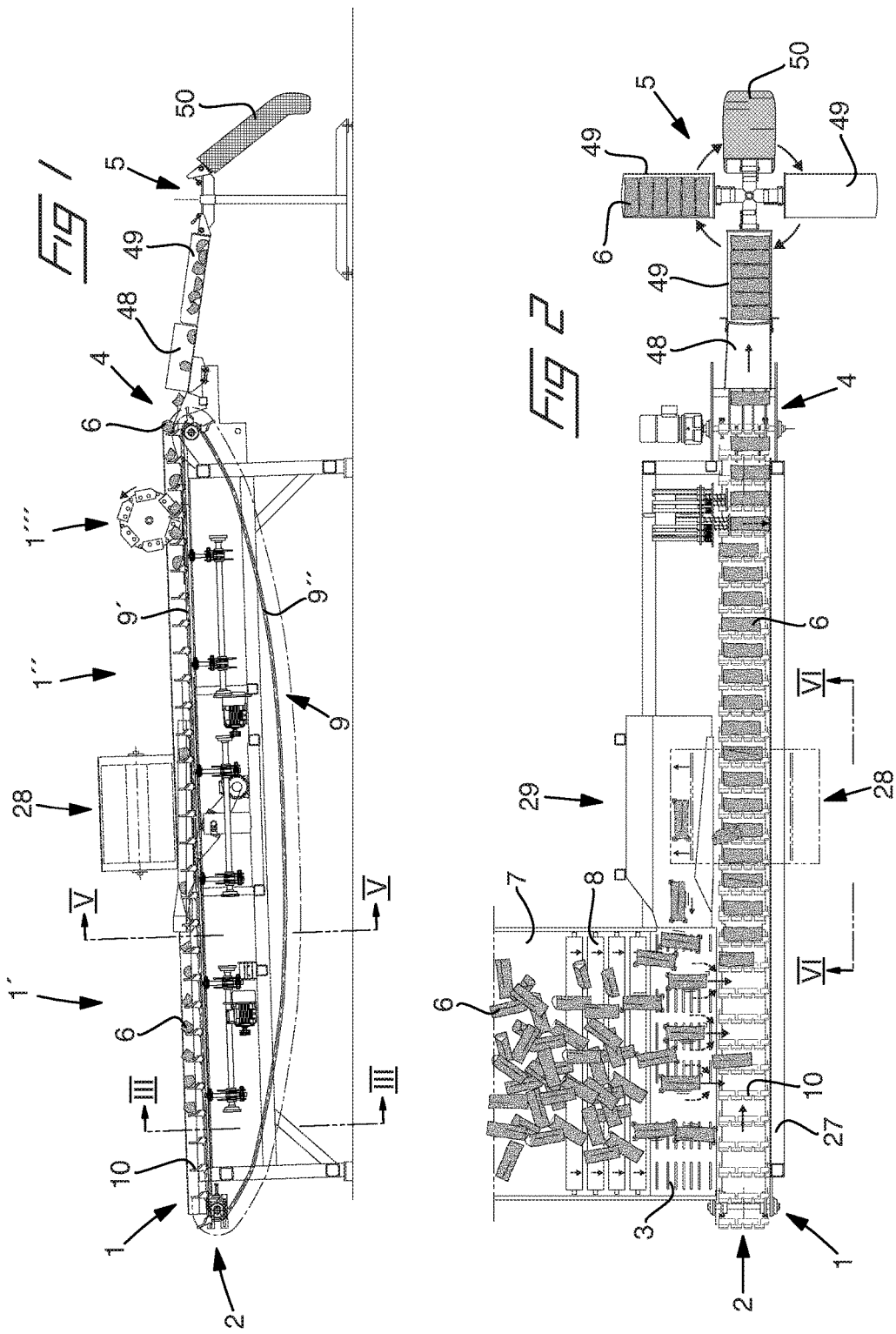

FIREWOOD HANDLING DEVICE

The present invention relates to a firewood handling device for firewood pieces comprising a conveyor, including two rotating, endless chains, the conveyor extending from an input end to an output end, wherein the conveyor chains are provided with carriers, which project outwards from the outer sides of the chains and extend across and at a distance from each other in relation to the longitudinal extension of the conveyor such that spaces are formed between the carriers into which firewood pieces can be positioned having their longitudinal extension across the longitudinal extension of the conveyor.

BACKGROUND OF THE INVENTION

Wood heating, i.e. burning of tree parts which have been cut off into firewood pieces of suitable lengths, normally between approximately 25-50 cm, and possibly have been split, represent a relatively large part of the renewable sources of energy produced in the world. In many cases it concern relatively large consumers, for example house owners which cover essentially the whole or a large part of their totally heating energy requirement during a year through firewood burning. In many cases these consumers cut and split all of their firewood need by themselves and dries the firewood e.g. in manually made wood piles, in large sacks or simply in a dumped stack under a roof.

However, there exist a large need of and a large market for purchasing of ready cut and split firewood, which is sold, bundled with straps or piled in sacks of relatively small volume and a weight between approximately 3-25 kg per unit such that these can be easily handled manually. Hereby a consumer, for example a house owner or a tenant, can easily purchase, load and transport smaller amounts of firewood for burning in open fireplaces, stoves and the like. Primarily maybe for the feel-good effect a wood fire can provide, but also to get a heating contribution to the regular heating. There is also a market for piling firewood on for example pallets provided with surrounding and securing railings or gates which can be loaded by means of for example pallet loader equipped loading machines onto trucks and/or trailers for delivery of larger amounts of firewood to a consumer. From SE 1100065 is known a device comprising a conveyor which, from a stack of cut and possibly split firewood, is capable of directing the firewood pieces in parallel in one direction and end-aligned in relation to each other along one end. However, a large problem is that there doesn't exist any equipment which automatically and rationally can convey the cut and split firewood pieces brought together and in parallel after cutting and splitting in order to facilitate subsequent bundling, packing into sacks or piling onto pallets. This work has up to now had to be performed entirely manually which is a hard, time consuming and monotone work where the risk for repetitive strain injuries among the personnel are large.

SUMMARY OF THE INVENTION

It is an object of the present invention to provide a firewood handling device having a conveyor comprising a rotating, endless chain for conveying firewood pieces with their longitudinal extension across the conveying direction of the conveyor which is capable of transmitting the firewood pieces brought together with essentially unchanged orientation onto a subsequent stacker, e.g. a planar surface or a collecting conveyor, in order to facilitate subsequent bundling, packing into sacks or piling of the firewood. At least this object is achieved by a firewood handling device according to embodiments described herein.

Accordingly, the basis of the invention is the insight that this general object may be achieved by forming the carriers of the conveyor with at least two non-through slots or recesses (i.e. the slots or recesses do not extend through the entire carrier) from below as well from above which are overlapping in relation to each other. Moreover, the conveyor is in its output end provided with at least two inner guiding members, which are connected to the conveyor in an area between a lower and an upper part of the chains, as well as at least two outer guiding members, which are connected to the conveyor outside of the area between the lower and the upper part of the chains, wherein both the inner and the outer guiding members are formed with smooth upper sliding surfaces and mounted such that the sliding surfaces of the inner guiding members extend and have an increasing height in the conveying direction and are positioned such that they are aligned with the slots or recesses extending from below in the carriers, whereas the sliding surfaces of the outer guiding members extend and have a decreasing height in the conveying direction and are positioned such that they are aligned with the slots or recesses extending from above in the carriers, and wherein the sliding surfaces of the inner and the outer guiding members extend essentially without interruption or somewhat overlapping in relation to each other as seen in the conveying direction.

Within the scope of this general inventive idea the invention may be varied and modified in different ways. According to a hereinafter illustrated and described embodiment of the invention the firewood handling device is provided with two inner and four outer guiding members. However, the number of guiding members may be varied according to need. However, at least two inner and two outer guiding members are required in order to be able to balance the firewood pieces during transmission from the conveyor to the stacker. Moreover, the upper edge surfaces of the guiding members are curved in order to provide an as smooth passage as possible between the inner and the outer guiding members. However, the upper edge surfaces could also be essentially straight, wherein in such a case it will be formed an abrupt change of angle at the passage between the inner and outer guiding members, which however could be acceptable provided that the change of angle will not be too large. In order to provide an as smooth passage as possible between the inner and the outer guiding members it is also preferred that, as is specified in embodiments described herein, the sliding surfaces of the guiding members extend essentially without interruption or being somewhat overlapping in relation to each other in the conveying direction. The expression "essentially without interruption" should however be interpreted such that there may be provided a minor interruption of up to approximately ten mm between the inner and the outer guiding members without for this reason leading to any appreciable deteriorated function of the firewood handling device with regard to its ability to transmit the firewood pieces from the conveyor to the stacker with unchanged orientation. Moreover, in the illustrated embodiment the guiding members are plate shaped. However, it should be understood that they also could be formed in some other way, for example being provided with flanges along the edge surfaces and having a thinner web there between. In a similar way the carriers need not have the shape of plate-like, bent element but may be formed in some other suitable way. However, it is advantageous that the carriers are as smooth as possible and moreover it is necessary that each carrier extending across the conveyor at a certain given location along the longitudinal extension of the conveyor is a single unitary piece. This is because firewood pieces have such an irregular form with projecting knots and the like, which easily could hook into end edges and other irregularities of the carrier when moving firewood pieces into respective space between the carriers. Accordingly, it would not be possible to arrange a separate carrier part on each chain in case the conveyor is provided with two or more chains. In order to allow displacement of the carriers past the guiding members in the output end despite this, the carriers according to the invention are provided with slots or recesses for the guiding members. In a preferred embodiment the conveyor is provided with at least two chains. However, within the scope for the invention it is possible to form the firewood handling device with only one chain. This requires, however, that the conveyor also comprises some other type of supporting element, which may serve as sliding surface for the firewood pieces during moving along the conveyor, as for example the shaking plates in the hereinafter illustrated and described embodiment.

The hereinafter illustrated firewood handling device is provided with a shaking mechanism for directing orientation and displacement of the firewood pieces into the spaces between two successive carriers as well as a scraper device and an end-alignment device. It should however be understood that these devices could be designed in some other way or be completely omitted. Instead the firewood handling device could be a regular conveyor to which the cut firewood pieces are fed correctly oriented and are positioned in the spaces between the carriers. A possible end-alignment device could for example instead be arranged at the subsequent stacker.

By a firewood device according to the invention is ensured that the output from the main conveyor is performed so gently such that the mutual succession of the firewood pieces essentially do not change with regard to orientation, parallelism and possible end-alignment. On the other hand it is desirable that the firewood pieces at the output from the conveyor are moved close together without any real space between adjacent firewood pieces. In the embodiment the firewood pieces are fed out on a stacker in form of a rotatable cassette-table in order to allow easy packing of the firewood in sacks. As mentioned before the firewood could also be bundled by means of bundle straps, stacked onto pallets or the like after output from the output-end. Instead of a stacker in form of a cassette-table having a smooth surface the stacker could also be a conveyor, which is operated intermittently as firewood is charged from the firewood handling device, or as e.g. a table formed of elongated rods in parallel.

BRIEF DESCRIPTION OF THE DRAWINGS

Hereinafter an exemplary embodiment of a firewood handling device according to the invention will be described with reference to the drawings, in which is illustrated in:

FIG. 1 a longitudinal section through a firewood handling device according to the invention which is connected to a manually handled sack packing device in the output end;

FIG. 2 the firewood handling device according to FIG. 1 seen in a view from above, in which also is shown an input conveyor and an equalizing conveyor connected to the input end;

DETAILED DESCRIPTION OF AN EMBODIMENT OF THE INVENTION

Figure 3:
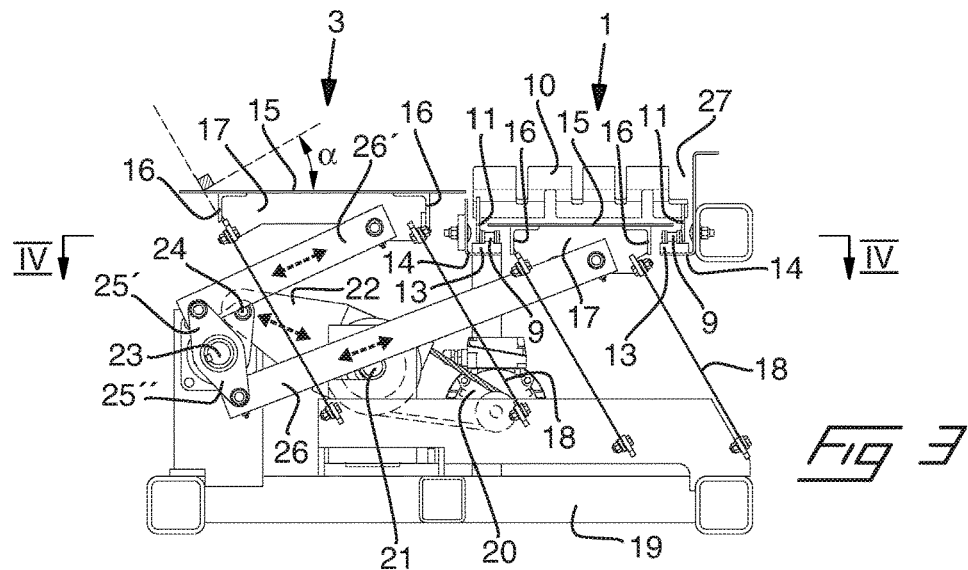
FIG. 3 a cross section along the line III-III in FIG. 1 through the input shaking table and the first section of the main conveyor which also illustrates the shaking mechanism which generates the shaking motions of these parts.

Reference is first made to FIGS. 1 and 2, in which overall views of a firewood handling device according to the invention are illustrated in a longitudinal section and a view from above, respectively. The firewood handling device comprises an elongated main conveyor 1, which in an input end 2 is provided with an input shaking table 3, positioned at the side of the main conveyor, and which, in the illustrated embodiment, is in an output end 4 connected to a manually operated, rotatable sack packing device 5. The purpose of the firewood handling device is to, from a flow of randomly oriented firewood pieces 6 which are fed in at the input end, arrange and feed out the firewood pieces in parallel and end-aligned in relation to each other in the output end in order to facilitate bundling, packaging into sacks or stacking of the firewood. In the illustrated embodiment the firewood pieces are supplied from a storage conveyor 7, to which the firewood can be supplied through e.g. a continuously operated belt conveyor (not shown) or be loaded by means of a loading machine equipped with a bucket. The storage conveyor is in the exemplary embodiment a not in detail shown scraper conveyor, which stepwise feeds the firewood pieces forward to a subsequent equalizing conveyor 8 provided with rotating rollers, which likewise stepwise feeds the firewood pieces further to the input shaking table 3. The stepwise feeding of the firewood of the storage conveyor and the equalizing conveyor is controlled by sensors, e.g. photoelectric cells, which detect the amount of firewood that at each moment is present on the equalizing conveyor and the input shaking table such that a desired amount of firewood pieces per time unit eventually reach the input shaking table in an as even flow as possible.

The main conveyor 1 is supported on a structure of vertical and horizontal beams and is a chain conveyor comprising two endless, rotating chains 9 of which an upper part 9' is moving along an upper side of the conveyor, whereas a lower part 9" is moving on the underside of the conveyor. The chains are connected by carriers 10 across the direction of motion of the conveyor which have the shape of plate-like, bent elements, as is best seen from FIG. 10. Each carrier is in each end provided with downward directed mounting flanges 11 in a plane in parallel to the direction of motion which each includes two through holes 12 for connection with respective chain. A cross section through the main conveyor is shown in FIG. 3 which is taken along the line III-III in FIG. 1 through the input shaking table 3 and the main conveyor 1 and also illustrates the shaking mechanism, which is accommodated in the area beneath these. The chains 9 and the lower edges of the mounting flanges 11 are supported on plastic sliding rails 13, which extend along the main conveyor's entire longitudinal extension and which are arranged on inward directed flanges of sheet metal sections 14 connected to the stand. Within an area which in a direction upwards is limited by the lower edges of the carriers 10, in a direction downwards by the chains 9 and towards the sides by the mounting flanges 11 of the carriers a shaking plate 15 is arranged on longitudinal angle bars 16, which extend in the longitudinal extension of the conveyor. At least two shaking plate fasteners 17, in form of fastening plates arranged in pairs, are arranged on the underside of each shaking plate and at a distance from each other across the main conveyor between downward extending flanges of the angle bars 16. Each shaking plate 15 is supported by inclined, resilient rods 18 in form of flat bar steel such that each shaking plate fastener 17 is connected by two resilient rods 18 with a lower frame 19 of the stand, i.e. each shaking plate is connected to the stand by at least four resilient rods. This has to effect that each shaking plate 15 is separately supported in relation to the rest of the conveyor and is limited movable in a direction perpendicular to the resilient rods 18 by elastic bending of the rods. In the embodiment shown the resilient rods are inclined by an angle of approximately 65° in relation to the horizontal plane, which means that the shaking plate is movable sideways and obliquely upwards/downwards in an angle $\alpha$ of approximately 25° in relation to the horizontal plane. The main conveyor is divided into three shaking table sections 1', 1", 1'" according to FIG. 1, which each is provided with a separate shaking plate, which is supported in a similar way as the first shaking table section 1' as described above.

The input shaking table 3 has a corresponding structure as the shaking table sections of the main conveyor, i.e. comprises a horizontal shaking plate 15, which is arranged on longitudinal angle bars 16 and has two shaking plate fasteners 17 in form of fastening plates arranged in pairs, which are mounted on a distance from each other between the angle plates and across the longitudinal extension of the shaking plate. Two inclined, resilient rods 18 in an angle of approximately 65° connect each shaking plate fastener with a lower frame work, which is common with the main conveyor such that the shaking plate is movable sideways and obliquely upwards/downwards in an angle $\alpha$ of approximately 25° in relation to the horizontal plane.

Figure 4:
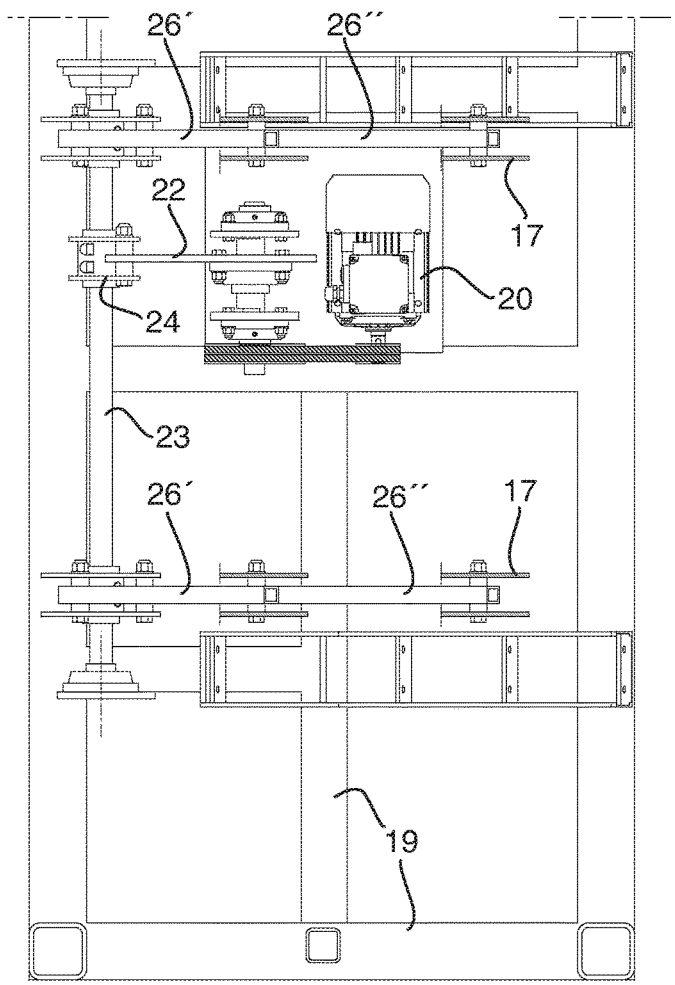
FIG. 4 a cross section along the line IV-IV showing the shaking mechanism below the input shaking table and the main conveyor according to FIG. 3 but with the resilient rods removed.

The shaking movements of the input shaking table 3 and the first shaking table section 1' of the main conveyor are generated by a common shaking mechanism, which is seen in addition to FIG. 3 also from in a view from above in FIG. 4 along the line IV-IV in FIG. 3. The shaking mechanism comprises an electric motor 20, which drives an eccentric shaft 21 through driving belts. A connecting rod 22 is rotatable and eccentrically connected to the eccentric shaft such that a rotary motion of the eccentric shaft is transformed to a reciprocating motion of the connecting rod. The reciprocating motion of the connecting rod 22 is transferred as a reciprocating rotary motion of a swing axle 23 through a lever 24 mounted on the swing axle. The swing axle is comparatively long and journalled in the lower frame 19. In the same vertical plane as the shaking plate fasteners 17 of the shaking plates the swing axle 23 is provided with articulated rods 25', 25", which are unrotatably mounted on the swing axle and which project in opposed directions from the swing axle in directions being essentially parallel to the resilient rods 18. An upper, short link rod 26' is in its one end articulated connected to the upward extending articulated rod 25' and in its other end articulated connected to the shaking plate fastener 17 of the input shaking table. A lower, long link rod 26" is in a corresponding way articulated connected in its one end to the downward extending articulated rod 25" and in its other end articulated connected to the shaking plate fastener 17 of the main conveyor. When driving the shaking mechanism the reciprocating motion of the connecting rod 22 will accordingly be transferred through the lever 24, the swing axle 23 and the articulated rods 25', 25" as a reciprocating motion of the link rods 26', 26" which in its turn gives a reciprocating shaking motion of the input shaking table 3 and the first shaking table section of the main conveyor 1, which shaking motion is directed perpendicular to the resilient rods 18. As the resilient rods are mounted obliquely in a plane perpendicular to the longitudinal extension or the conveying direction of the main conveyor, and more precisely in that they are inclined in a direction which is inclined upwards from the side of the main conveyor which is turned from the input shaking table, as is seen from FIG. 3, the shaking motions will be directed obliquely upwards in a direction towards and obliquely downwards in a direction from the side of the main conveyor which is turned from the input shaking table. A shaking motion directed in such a way will have to result that firewood pieces which are fed out on the input shaking table 3 will be fed in the direction towards the main conveyor 1, as is previously well known within the technology for shaking table conveyors. Shaking motions directed in such a way will also have to result that the firewood pieces will be oriented with their longitudinal extension in parallel to the direction of the shaking motions, i.e. perpendicular to the conveyor direction of the main conveyor. In this way it is possible to automatically transfer the firewood pieces in between the carriers of a conveyor during continuous operation. In order to further facilitate the transfer of the firewood pieces into the spaces between two consecutive carriers the shaking plate of the input shaking table 3 is positioned on higher level than the shaking plate of the main conveyor 1, as is seen from FIG. 3. By that also the main conveyor in a first section at the input end 2 is provided with a shaking plate, which generates shaking motions which in the upward movement are directed across its conveying direction towards the side of the conveyor which is turned away from the input shaking table 3, the firewood pieces will continue their movement in this direction also after they have landed up in the spaces between the carriers 10 on the main conveyor. For this reason the main conveyor is provided with a side border 27 formed of a vertical oriented plate on the side which is turned away from the input shaking table. By this the firewood pieces will be end-aligned against this side border in relation to each other in their ends which are turned away from the input shaking table.

Despite that the input shaking table 3 and a first section 1' of the main conveyor are provided with a shaking mechanism which is generating shaking motions according to the description above and which therefore orients and displaces the firewood pieces 6 in a direction perpendicular to the conveyor direction of the main conveyor it may happen, due to the continuous driving of the main conveyor, that some firewood pieces land up on top of the carriers or that two or more firewood pieces land on top of each other in a space between two carriers which may make it difficult to achieve the end alignment against the side border 27. For this reason the firewood handling device according to the embodiment is provided with a scraper device 28 and a return conveyor 29 in the area behind the input shaking table, as is seen from FIGS. 1 and 2. The purpose of the scraper device 28 is to remove or strike off possible firewood pieces 6, which project too long above the main conveyor and to remove these to the return conveyor 29, which is positioned aside of and in parallel to the main conveyor 1 and to effect return of the removed firewood pieces back to the input shaking table 3.

Figure 5:
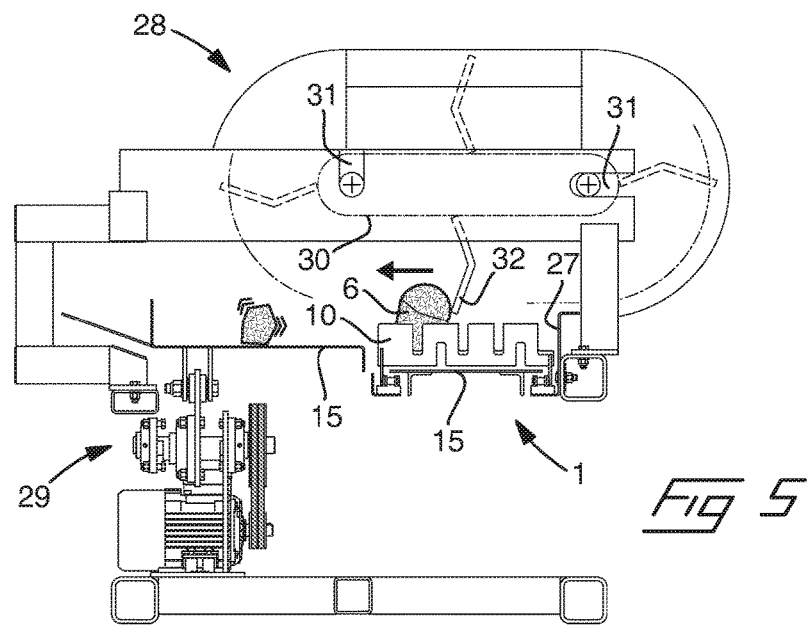
FIG. 5 a cross section along the line V-V in FIG. 1 through the main conveyor and a return conveyor at the side of the main conveyor as well as a partly cut-through side view of a scraper device positioned above.

The closer design of the scraper device 28 is shown in a partly cut-through side view and a cross section through the main conveyor 1 and the return conveyor 29 according to FIG. 5, which is taken along the line V-V in FIG. 1. The scraper device is positioned on a small distance above and across the main conveyor and comprises an endless belt 30, which is rotatably driven around two belt rollers 31 and which is provided with four projecting scraper members 32, which during operation will in due succession strike on a small distance over the main conveyor from the side of the main conveyor which is turned away from the input shaking table towards the return conveyor 29 which is positioned on the same side as the input shaking table 3. Thereby, any firewood pieces 6 that project sufficient far above the main conveyor, which e.g. is resting on top of the carriers 10 as is exemplified in FIG. 5, will be carried away by the scraper members 32 and be removed to the return conveyor 29.

Figure 6:
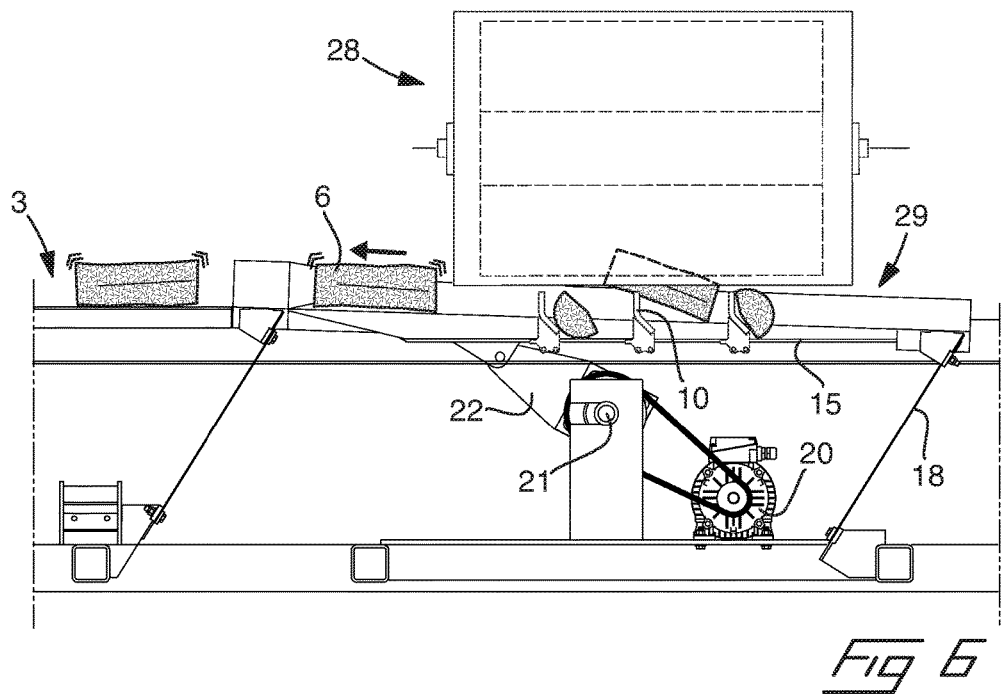
FIG. 6 a schematic, cut-through side view of the return conveyor according to FIG. 5 with the scraper device indicated with dash-dotted lines as seen in the direction of the arrows VI-VI in FIG. 2.

The return conveyor 29 is shown in a longitudinal section in FIG. 6 in a direction indicated by the arrows VI-VI in FIG. 2. In the figure is also illustrated some of the carriers 10 of the main conveyor 1. The return conveyor is arranged as a shaking conveyor and is provided with a shaking mechanism comprising resilient rods 18, a motor 20, an eccentric shaft 21 driven by a belt and a connecting rod 22 in a similar way as described in connection to FIGS. 3 and 4 with the difference that in this case the connecting rod 22 is acting directly on the shaking plate 15 without any intermediate swing axle, articulated rod or link rod. As is seen from FIG. 6 the return conveyor 29 is sloping upwards in the direction towards the input shaking table 3 in order to move up the firewood pieces to at least the same level as the input shaking table.

Figure 7:
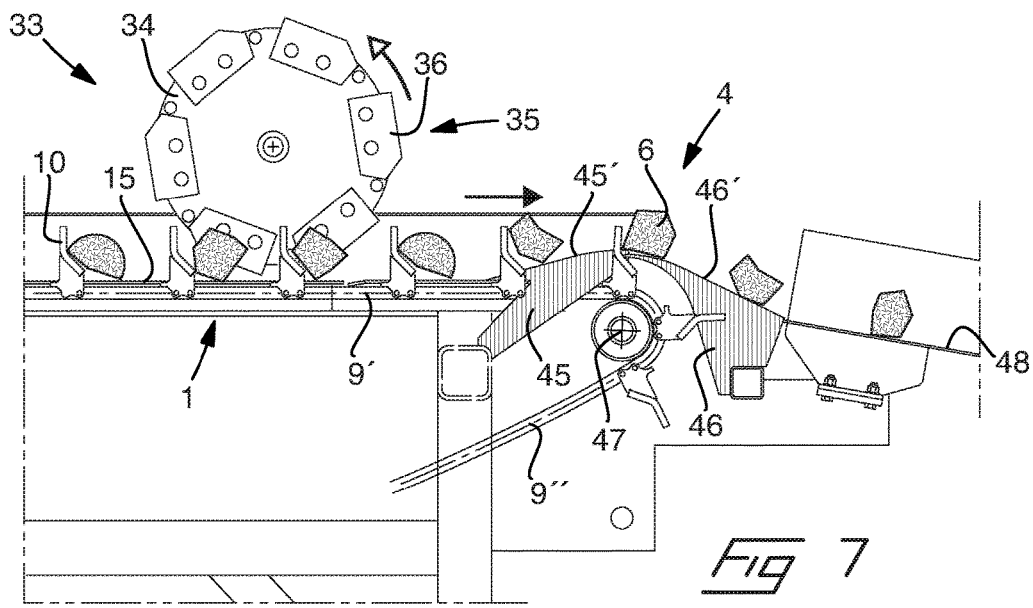
FIG. 7 a cross section through the output end of the main conveyor and an end view of an end-alignment device positioned in connection to it.
Figure 8:
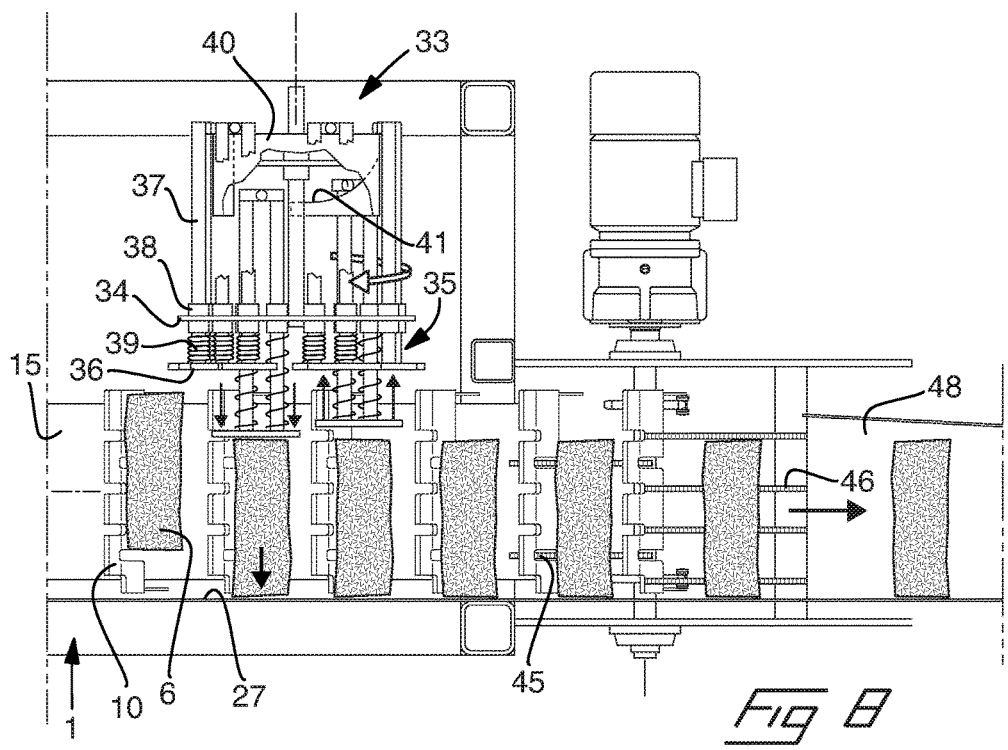
FIG. 8 a view from above according to FIG. 7.

Next, reference is made to FIGS. 7 and 8 in which are shown an end-alignment device 33 in an end view and a view from above, respectively, which is positioned in the area between the scraper device 28 and the output end 4, as is seen from FIGS. 1 and 2. As mentioned before the main conveyor, according to the embodiment, is divided into a second shaking table section 1" in a middle part in the area around the scraper device 28, as well as a third shaking table section 1''' in an end portion towards the output end 4, which both are arranged with a bottom in form of a shaking plate 15, which performs shaking motions by means of a shaking mechanism similar to the one describe in connection with FIGS. 3 and 4 and at which the shaking motions are directed such that the firewood pieces 6 strive towards end-alignment against the side border 27, which is positioned on the side of the main conveyor 1 which is turned from the input shaking table 3 and along the entire main conveyor. However, in some instances the shaking movements of the main conveyor are not sufficient to end-align all firewood pieces close to the side border 27, which is a requirement for to facilitate subsequent handling of the firewood such as packing into sacks or stacking of the firewood on pallets. Particularly after the above described scraper device 28 may disorder appear with regard to the position of the firewood on the main conveyor since at removing of incorrect positioned firewood pieces also underlying, correct positioned firewood pieces may be influenced.

For this reason the firewood handling device according to the embodiment is accordingly provided with an end-alignment device 33 shortly before the output end 4 which is operated synchronized with the moving speed of the main conveyor 1 and provides for tight pressing of ends of the firewood pieces against the side border 27. As is seen from FIGS. 7 and 8 the end-alignment device 33 has the shape of a wheel 34, which is positioned with an end-surface towards and at the side of the main conveyor 1 such that a lower periphery of the wheel is positioned immediately above the shaking plate 15 of the main conveyor. Around the periphery of the wheel's end-surface the wheel is provided with several projectable end-alignment actuators 35, which have a shape allowing projecting of the end-alignment actuators into a space between two consecutive carriers 10. More precisely, each end-alignment actuator 35 is provided with a plate 36, which on its rear side is provided with two projecting rods 37 perpendicular to the plane of the plate which are mounted longitudinally displaceable in guide bushings 38 in the wheel. Pressure springs 39 are arranged between the guide bushings 38 and the plates 36 which strive to project the plate outwards from the wheel. In the rear part of the wheel a cylindrical guide plate 40 (partly shown in a cut through view in FIG. 8) is fixedly mounted such that it does not rotate together with the wheel. A rear end edge of the guide plate 40 forms a cam profile, which engages the rear ends of the longitudinally displaceable rods 37 and restricts their maximum projection. The cam profile of the guide plate 40 is shaped such that it over a larger part of the wheel rotation holds the rods and the plates mounted on their ends retracted towards the wheel. The part of the guide plate which is located at the area of the lower periphery is however formed with an indentation 41 in the end edge, as is schematically illustrated in FIG. 8, which allows projection of the end-alignment actuators by means of the spring force in the pressure springs 39, wherein the projecting is stopped as soon as the respective firewood piece 6 abut against the side border 27. The rotation of the end-alignment device 33 is arranged by a not shown chain-drive from the drive of the main conveyor which at the same time ensures synchronization in relation to the main conveyor 1.

Figure 9:
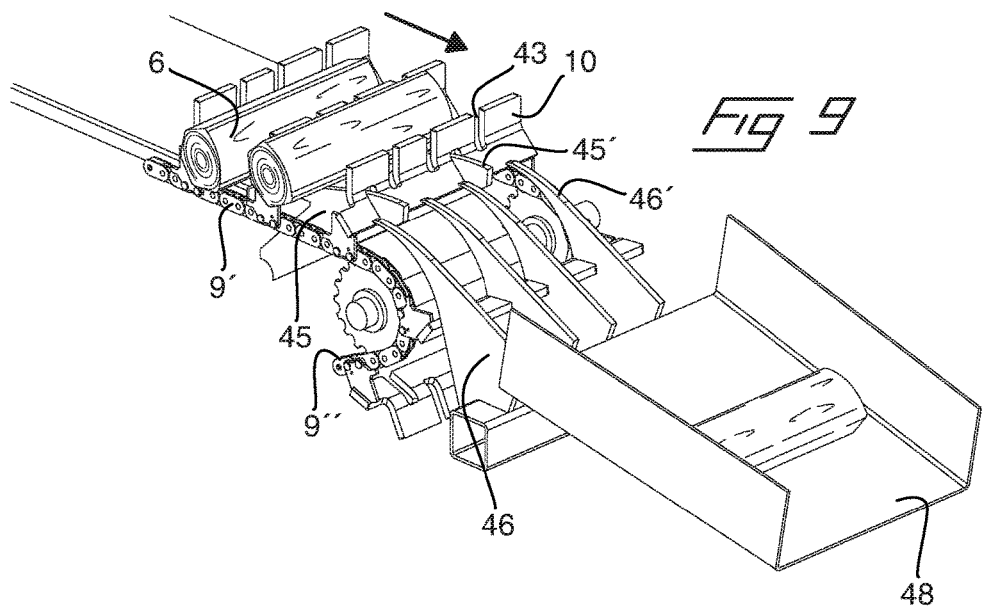
FIG. 9 a partly cut-through perspective view of the output end of the main conveyor as well as a collecting trough for output firewood pieces.
Figure 10:
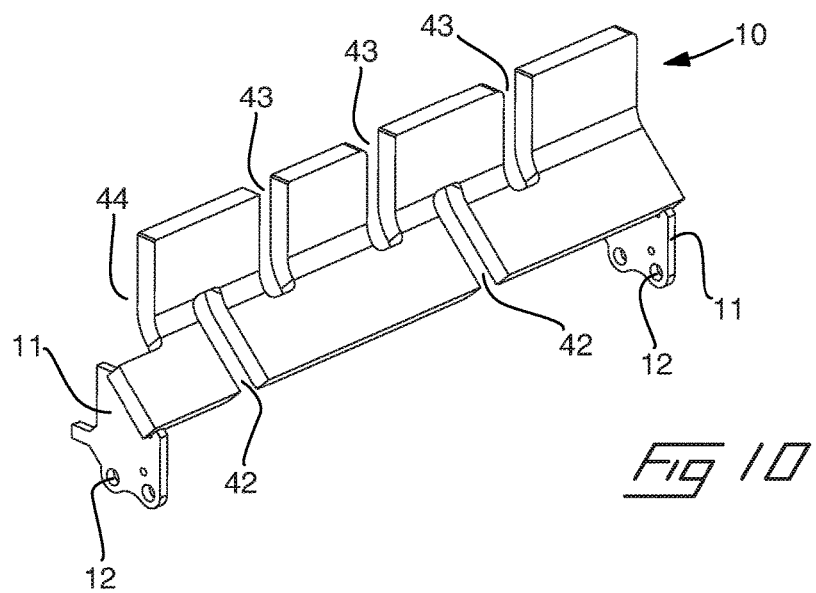
FIG. 10 a perspective view of one of the carriers of the main conveyor.

Next, reference is made in addition to FIGS. 7 and 8 also to FIGS. 9 and 10 for a more detailed of the design of the carriers 10 as well as the output end 4 of the main conveyor. As has been described the firewood handling device achieves that from a disordered flow or an overturned heap of firewood pieces, automatically arrange the firewood pieces 6 such that they will be positioned in parallel and end-aligned along one end in relation to each other. Naturally, it is thereby important that the firewood pieces maintain their mutual organized positions also after discharging of the firewood at the output end 4 of the firewood handling device. In the exemplary embodiment this is achieved by that the main conveyor's carriers 10 are provided with two not cut through slots 42 from below and three not cut through slots 43 from above as well as a recess 44 at the left end edge as seen in the direction against the conveying direction according to FIG. 10. The lower slots 42 and the upper slots 43 and the recess 44 as well overlap each other, i.e. they overlap each other to some extent in the vertical direction but are positioned in different vertical planes. Moreover, the main conveyor is in the output end provided with two inner guiding members 45, which are connected to the conveyor stand between the lower and upper parts 9', 9"

of the conveyor chains as well as four outer guiding members 46, which are connected to the conveyor stand in an area outside of the lower and upper parts of the conveyor chains, i.e. outside of the closed loops of the conveyor chains 9. The guiding members 45, 46 have a flat shape and are quite thin in the vertical plane and are formed with smooth, upper curved edge surfaces 45', 46'. The inner guiding members 45 are mounted such that their curved edge surfaces 45' extend and have an increasing height in the conveying direction and are positioned such that they are aligned with the slots 42 extending from beneath in the carriers. The outer guiding members 46 are mounted such that their curved edge surfaces 46' extend and have a decreasing height in the conveying direction and are positioned such that they are aligned with the slots 43 and the recess 44 extending from above in the carriers 10. The inner and outer curved edge surfaces 45', 46' of the guiding members meet along the highest line in the area above an axis 47 of rotation for return wheels around which the conveyor chains run at the transfer from an upper conveying part 9' to a lower return part 9", and preferably they meet in essentially the same vertical plane or somewhat overlapping such that essentially no discontinuity is formed between the inner and outer guiding members 45, 46 in the conveying direction in order to achieve a gentle transition for the firewood pieces 6 at the output from the conveyor. However, in the embodiment the upper edge surfaces 46' of the outer guiding members are positioned on a somewhat lower level than the edge surfaces 45' of the inner guiding members, as is seen from FIG. 7, in order to reduce the risk for that some anomaly, for example a knot, of a firewood piece should hook on to the outer end surface of the guiding member at the passage.

In the embodiment of the output end of the firewood handling device as described above and illustrated in the drawings, this is provided with two inner guiding members 45 and four outer guiding members 46. It should be understood however, that the number of guiding members, inner as well as outer, can be varied within wide limits but at least two inner and two outer guiding members are required.

Beyond the outer guiding members the firewood pieces 6 positioned in parallel and end-aligned are accumulated on a collecting trough 48 having a somewhat downward sloping bottom, as is seen from FIGS. 1 and 9, and subsequently the firewood can be transferred to one of four sack packing troughs 49 of a manually operated sack packing device 5 according to FIGS. 1 and 2, which is rotatable such that a sack packing trough 49 can be rotated in due succession into alignment with the collecting trough 48 and the firewood 6 be transferred from the collecting trough 48 to the respective sack packing trough 49. At the transferring of the firewood into sacks a sack 50 is passed over a sack packing trough 49 filled with firewood, and subsequently the trough can be tipped down, as is illustrated in FIG. 1, such that the firewood fall down to the bottom of the sack and subsequently the same is removed from the sack packing trough.

The invention claimed is:

1. Firewood handling device for firewood pieces comprising
    a conveyor, including one or more rotating, endless chains, the conveyor extending from an input end to an output end,
    wherein the conveyor chains are provided with carriers, which project outwards from the outer sides of the chains and extend across and on a distance from each other in relation to the longitudinal extension of the conveyor such that spaces are formed between the carriers into which firewood pieces can be positioned having their longitudinal extension across the longitudinal extension of the conveyor,
    wherein the carriers are formed with at least two, not cut through slots or recesses from below as well as from above which overlap each other,
    wherein the conveyor in its output end is provided with at least two inner guiding members, which are connected to the conveyor in an area between a lower and an upper part of the chains, as well as with at least two outer guiding members, which are connected to the conveyor outside of the area between the lower and the upper part of the chains,
    wherein both the inner and the outer guiding members are provided with smooth upper sliding surfaces and are mounted such that the sliding surfaces of the inner guiding members extend and have an increasing height in the conveying direction and are positioned such that they are aligned with the slots or recesses extending from below in the carriers,
    whereas the sliding surfaces of the outer guiding members extend and have a decreasing height in the conveying direction and are positioned such that they are aligned with the slots or recesses extending from above in the carriers, and
    wherein the sliding surfaces of the inner and the outer guiding members extend essentially without interruption or somewhat overlapping in relation to each other as seen in the conveying direction such that essentially no discontinuity is formed between the inner and outer guiding members in the conveying direction.

2. Firewood handling device according to claim 1, wherein the guiding members are plate-shaped.

3. Firewood handling device according to claim 1, wherein the guiding members are formed with smooth and curved upper edge surfaces.

4. Firewood handling device according to claim 1, further comprising at least two inner guiding members and at least four outer guiding members.

5. Firewood handling device according to claim 1, wherein the carriers have the shape of plate-like, bent elements.

6. Firewood handling device according to claim 1, wherein the spaces for the firewood pieces between the carriers of the conveyor each has a width in the conveying direction which is smaller than the length of the firewood pieces to be handled by the device.

7. Firewood handling device according to claim 1, further comprising a shaking mechanism in order to move the firewood pieces into the spaces between the carriers.

8. Firewood handling device according to claim 1, further comprising a scraper device with the purpose to remove or strike off possible firewood pieces which project too far above the conveyor.

9. Firewood handling device according to claim 1, further comprising an end-alignment device.

* * * * *